United States Patent Office 3,825,439
Patented July 23, 1974

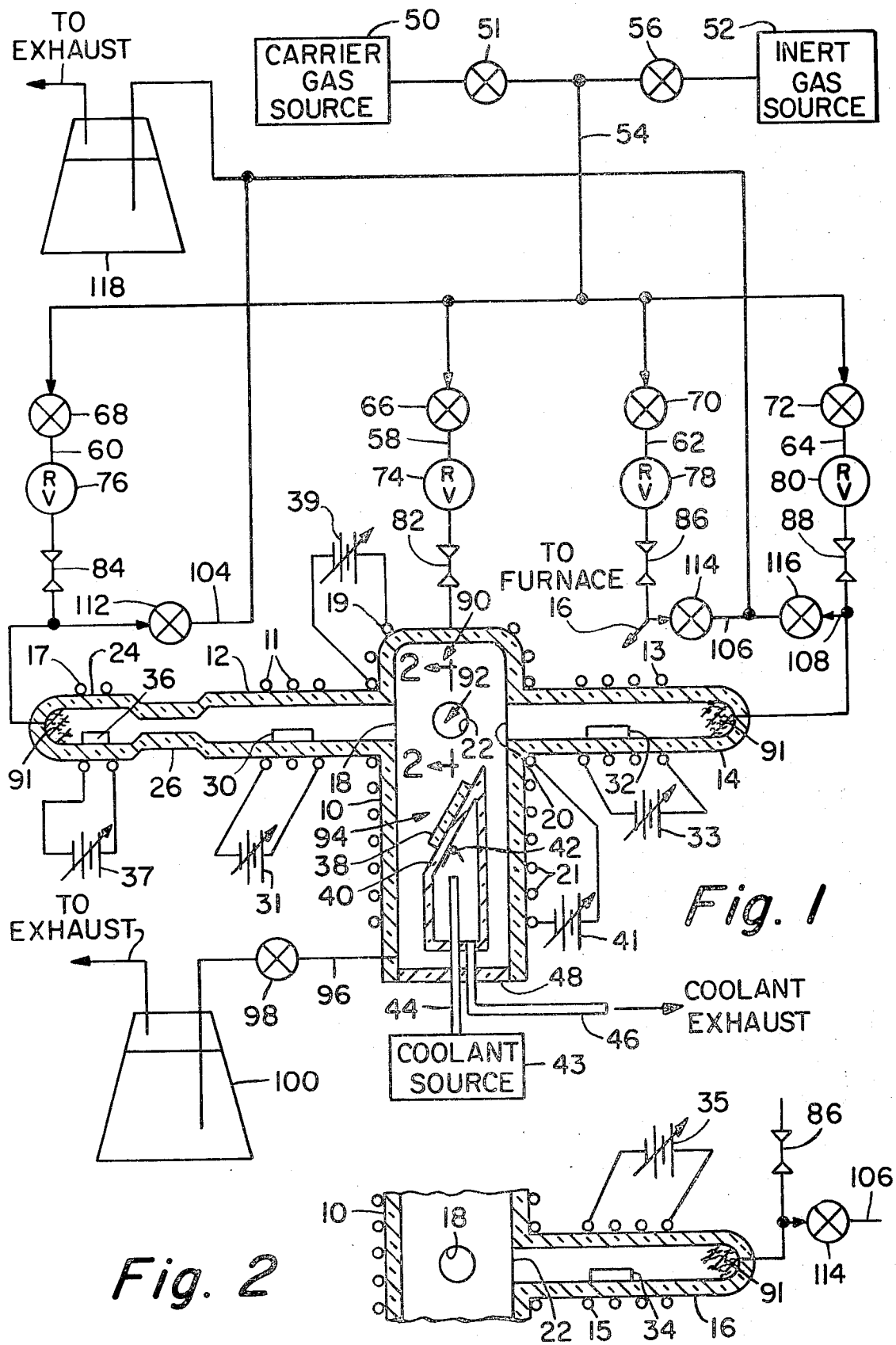

3,825,439
METHOD FOR FORMING AMORPHOUS SEMICONDUCTORS
Paul A. Tick, Painted Post, N.Y., assignor to Corning Glass Works, Corning, N.Y.
Filed Aug. 16, 1972, Ser. No. 281,218
Int. Cl. C23c 11/08, 13/04
U.S. Cl. 117—106 R                      16 Claims

ABSTRACT OF THE DISCLOSURE

A method of forming a chalcogenide glass film which contains at least one of the chalcogens sulfur, selenium, and tellurium and at least one of the Group IV A elements germanium and silicon. The Group IV A element is heated to a temperature sufficient to cause it to react with chalcogen vapors. A carrier gas passes over a first heated chalcogen source to provide a first gas mixture which passes over the surface of the Group IV A element to form a second gas mixture containing chalcogen vapors and vapors of the products of reaction of the first chalcogen and the Group IV A element. In a similar manner, vapors from other chalcogen sources and vapors from other sources of amorphous semiconductor components can be obtained by carrier gas streams. All of the vapors which are to form the film are mixed and transported over the surface of a substrate the temperature of which is maintained between 160° C. and 250° C., which is sufficient to cause the formation of a continuous homogeneous film thereon. This method provides accurate composition control and composition variations throughout the film. A gas flow reversal technique provides accurate thickness control.

BACKGROUND OF THE INVENTION

I. Field of the Invention

This invention relates to a method and apparatus for forming films of amorphous semiconductors which contain one or both of the Group IV A elements silicon and germanium. Amorphous semiconductors of the type to which the present invention pertains, contain one or more of the chalcogens sulfur, selenium and tellurium, and they are therefore often referred to as chalcogenide glasses. The term "chalcogen" as used herein, refers only to sulfur, selenium and tellurium and excludes oxygen.

The amorphous semiconductors referred to herein are generally related to the types of materials described in U.S. Pats. Nos. 3,117,013, 3,271,591 and 3,453,583. These semiconductors, which may include elements from Groups III A, IV A, V A, VI A and VII A of the Periodic Chart, are useful in such devices as solid state current controlling devices and infrared transmitting devices. More specifically, amorphous semiconductors are generally based on combinations of one or more of the chalcogens sulfur, selenium and tellurium along with one or more of the elements arsenic, phosphorus, silicon and germanium, and they may also include such elements as chlorine, bromine, iodine, antimony, gallium, indium and thallium. Although other elements are sometimes used as additives, the aforementioned elements impart the primary characteristics to amorphous semiconductors.

II. Description of the Prior Art

Chalcogenide glass films are usually prepared by RF sputtering or the flash evaporation technique. RF sputtering is expensive; it requires the use of cathode materials having the exact composition of the film to be deposited, and furthermore, it is difficult to deposit films having composition gradients by this technique. Also, due to the high energy of the particles being deposited on the substrate by sputtering techniques, crystallites may be formed in the amorphous film. In accordance with the flash evaporation technique, glasses having the desired composition are initially prepared, ground into a powder and then flash evaporated to deposit a film on the substrate. Temperature is very critical for this method, and film thickness is difficult to control. Also, this latter method cannot be used to deposit films having composition gradients.

SUMMARY OF THE INVENTION

An object of the present invention is to provide a method of forming crystallite-free films of amorphous semiconductors.

Another object of the present invention is to provide an easily controlled method of forming films or layers of amorphous semiconductors containing silicon, germanium or mixtures thereof. As a result of the control which can be exercised over the method of this invention, films of a desired composition can be continually reproduced, and the amount of one or more elements in the resultant film can be varied to form composition gradients within a film. Film thickness can also be accurately controlled.

It is known that vapors of an element or compound can be transported by a carrier gas to a remote deposition area by heating the element or compound to a temperature sufficiently high to increase the vapor pressure thereof to a value that is sufficient to sustain the growth of a film at said deposition area at a reasonable rate. If the temperatures required for this process can be kept to less than about 1200° C., inexpensive materials can be used for the furnaces and resistance heating wires. Above this temperature platinum heating windings and refractory furnace materials become necessary, thereby increasing equipment costs and causing other disadvantages associated with the generation and control of high temperatures.

Amorphous semiconductors comprising such elements as one or more of the chalcogens and one or more of the Group IV A elements germanium and silicon have not heretofore been produced by the vapor transport technique because of the low vapor pressure of these Group IV A elements. Table 1 lists the vapor pressures of some of the elements which are commonly used in the formation of semiconducting chalcogenide glasses.

TABLE 1

| Element | Temperature in degrees C, for the vapor pressure in mm. Hg | | | |
|---|---|---|---|---|
|  | $10^{-2}$ | 1 | 10 | 100 |
| Arsenic | 277 | 372 | 439 | 522 |
| Tellurium | 374 | 518 | 632 | 792 |
| Selenium | 243 | 363 | 466 | 553 |
| Germanium | 1,327 | 1,682 | 2,047 | 2,047 |
| Silicon | 1,632 | 2,057 | 2,347 | 2,716 |
| Sulfur | 109 | 189 | 246 | 333 |
| Phosphorus | 185 | 261 | 309 | 369 |

It is seen that temperatures in excess of 1300° C. are required to increase the vapor pressures of germanium and silicon to $10^{-2}$ mm. Hg, a value which is considered to be the minimum acceptable vapor pressure for the vapors of an element to be transported to a deposition area for the purpose of forming a film. Moreover, to achieve vapor pressures between 10 and 100 mm. Hg, values which are necessary for an efficient process, temperatures in excess of 2000° C. are necessary. However, the following publications report experiments indicating that the volatility of germanium and silicon can be effectively increased by heating these elements in the presence of tellurium: V. D. Ignatkof et al., Soviet Physics Solid State 3, 1, July 1961; V. E. Kosenko et al., Soviet Physics Solid State 3, 2, August 1961; and S. Fischler, "Vapor Growth and Doping of Silicon Crystals With Tellurium as a Carrier," Conference on Epitaxy and Semiconductors, published in 1963. This latter publication describes the growth of single crystals of silicon doped with tellurium in a sealed tube having sources of silicon and tellurium disposed therein. It has been found that a carrier gas mixed with vapors from a source of sulfur, selenium or tellurium can be passed over a source of germanium or silicon heated to a temperature as low as 900° C. for the purpose of transporting the germanium or silicon to a remote deposition area. The use of tellurium vapor is preferred since the effective evaporation rate of both silicon and germanium can be increased many orders of magnitude in the presence thereof.

Therefore, another object of this invention is to provide a method of depositing silicon or germanium-containing amorphous films by a vapor transport technique which utilizes relatively low temperatures.

The present invention relates to a method of forming a film of an amorphous semiconductor of the chalcogenide glass type which comprises at least one of the chalcogens sulfur, selenium and tellurium and at least one of the Group IV A elements germanium and silicon. Briefly, this method comprises disposing a substrate in a deposition chamber and heating the substrate to a temperature less than the crystallization temperature of the amorphous semiconductor to be deposited and sufficiently high to cause the formation of a continuous homogeneous film on the substrate, the temperature also being sufficiently high to prevent the nucleation of individual particles rather than a continuous film. There is provided a first gas mixture of carrier gas containing vapors of a chalcogen selected from the group consisting of tellurium, selenium and sulfur, the partial pressure of the chalcogen being between $10^{-2}$ and 100 mm. Hg. A Group IV A element selected from the group consisting of germanium and silicon is heated to a temperature sufficient to support a reaction between it and the chalcogen. The first gas mixture is passed over the surface of the Group IV A element to form a second gas mixture containing chalcogen vapors and vapors of the products of reaction of the chalcogen and the Group IV A element. This second gas mixture is directed onto a surface of the substrate where there is formed a film of an amorphous semiconductor comprising the chalcogen and the Group IV A element.

BRIEF DESCRIPTION OF THE DRAWINGS

FIG. 1 is a schematic representation, partially in cross-section, of an apparatus for forming films of an amorphous semiconductor.

FIG. 2 is a cross-sectional view taken along lines 2—2 of FIG. 1.

DETAILED DESCRIPTION OF THE INVENTION

FIGS. 1 and 2 are schematic representations of an apparatus for performing the method of the present invention. A reactant furnace 10 has a plurality of main feeder furnaces 12, 14 and 16 connected around the circumference thereof, the intersections of furnaces 12, 14 and 16 with furnace 10 defining apertures 18, 20 and 22, respectively. A preliminary feeder furnace 24 is connected by coupler 26 to that end of furnace 12 opposite aperture 18. Since the aforementioned furnaces are subjected to high temperatures and corrosive gases, they must be constructed from inert materials such as glass, glass-ceramic, ceramic or the like. Any suitable heating means such as coils of nickel chromium resistance heating wires 11, 13, 15, 17, 19 and 21 may be used to provide the necessary high temperatures. This wire can be wound more tightly, or individual coils thereof can be provided with a higher current in those regions requiring higher temperatures. Variable voltage sources 31, 33, 35, 37, 39 and 41 are connected to heating wires 11, 13, 15, 17, 19 and 21, respectively. Although only three main feeder furnaces are illustrated, any number thereof could be connected to reactant furnace 10 depending upon the desired composition of the film to be deposited. Furthermore, more than one main feeder furnace can be provided with a preliminary feeder furnace so that silicon and germanium can be simultaneously deposited. Feeder furnaces 12, 14, 16 and 24 contain boats 30, 32, 34 and 36 for supporting sources of those elements which are to be vaporized and deposited. Boat 36 contains a chalcogen, the vapors of which effectively increase the volatility of germanium and silicon by chemically reacting with these Group IV A elements.

A substrate 38 is so disposed in reactant furnace 10 as to be subjected to vapors emanating from the feeder furnaces. Substrate 38 is disposed upon support 40 which may be made from any suitable noncorrosive, high temperature heat conducting material such as stainless steel. A thermocouple 42, which is disposed within substrate support 40, may be connected to any suitable utilization means such as a temperature indicator, a temperature controller or the like. A coolant such as air, water or the like is caused to flow into holder 40 by pipe 44 and is exhausted from holder 40 by pipe 46. Pipes 44 and 46 may pass through an end wall 48 which may be removed in order to remove holder 40.

A source 50 of carrier gas and a source 52 of inert gas are connected by valves 51 and 56, respectively, to line 54, which is connected to diluent line 58 and to feeder furnace lines 60, 62 and 64. Connected in series with lines 58, 60, 62 and 64 are on-off valves 66, 68, 70 and 72, regulating valves 74, 76, 78 and 80, and flowmeters 82, 84, 86 and 88, respectively. The output from flowmeter 82 is connected to diluent chamber 90 of furnace 10 whereas the outputs of flowmeters 84, 86 and 88 are connected to furnaces 24, 16 and 14, respectively. The ends of furnaces 14, 16 and 24, to which the carrier gas lines are connected, are filled with glass wool 91. Gases flowing from diluent chamber 90 and from feeder furnaces 12, 14 and 16 are combined in mixing chamber 92 and thereafter flow to growth chamber 94.

That portion of furnace 10 opposite mixing chamber 92 is provided with an exhaust line 96 containing an on-off valve 98 and an oil trap 100. Exhaust lines 104, 106 and 108 are connected to feeder furnaces 24, 16 and 14, respectively. Exhaust lines 104, 106 and 108, which are provided with on-off valves 112, 114 and 116, are connected to an exhaust by oil trap 118.

The carrier gas provided by source 50 must be reducing and must have a low molecular weight. The reducing property retards passivation of the source elements which are disposed in the boats, whereas the low molecular weight causes the rate limiting step in the condensation process to be the diffusion of the carrier gas away from the surface of the substrate. Low molecular weight gases are also advantageous in that they possess good thermal conductivity and therefore can be rapidly heated in preparation for carrying vapors and can be rapidly cooled in the film deposition process. Suitable carrier gases are mixtures of hydrogen and helium, hydrogen, forming gas and the like. The inert gas provided by source 52, which may be argon, xenon or the like, also prevents oxidation of the sources.

The furnace system of FIGS. 1 and 2 is suitable for the deposition of films of an amorphous semiconductor on substrate 38, which may consist of any suitable material such as glass, ceramic, metal or the like which can withstand the temperature in furnace 10. As stated hereinabove, amorphous semiconductors are generally based upon combinations of one or more of the chalcogens sulfur, selenium and tellurium, along with one or more of the elements arsenic, phosphorus, silicon and germanium, and such elements as chlorine, bromine, iodine, antimony, gallium, indium and thallium may also be included. As indicated in Table 1 the vapor pressures of all of these elements except germanium and silicon can be increased to a level that is sufficiently high for use in a vapor transport film deposition technique by subjecting these elements to temperatures below 1200° C. Therefore, such elements can be disposed in one of the boats 32 or 34 and heated in one of the furnaces 14 or 16, respectively, to a temperature between 900° C. and 1200° C. which is sufficient to raise the partial pressure thereof to a value between $10^{-2}$ mm. Hg and 100 mm. Hg, the preferred partial pressure for the disclosed apparatus being between 10 and 100 mm. Hg. Partial pressures under $10^{-2}$ mm. Hg would not produce a reasonable growth rate. Those of about 100 mm. Hg and above would cause particles to condense from the vapor phase and form granules before the vapors contacted the substrate, and the resultant film therefore would have a grainy appearance.

Since germanium and silicon must normally be heated to temperatures in excess of 1300° C. to increase the vapor pressures thereof to a minimum acceptable value for vapor transport deposition, these elements must be disposed in feeder furnaces such as furnace 12 which has associated therewith a primary feeder furnace 24 which is capable of providing chalcogen vapors. In the embodiment illustrated, the chalcogen source is disposed in boat 36 and the source of germanium or silicon is disposed in boat 30. The Group IV A element is heated to a temperature sufficient to support a reaction between it and the chalcogen vapors supplied by furnace 24. In the apparatus illustrated temperatures above 900° C. are sufficient to support such a reaction.

If the furnace system is to remain idle for a relatively long period of time it is pressurized with inert gas to prevent the sources contained in boats 30, 32, 34 and 36 from reacting with oxygen or other contaminants. To prepare the furnace system for an overnight shutdown or similar period of inactivity, valves 56, 66, 68, 70, 72 and 98 are opened to permit the flow of inert gas into the feeder furnaces and diluent chamber 90 and through furnace 10 from which it is exhausted through line 96. During this period, end wall 48 and substrate support 40 are removed and end wall 48 is replaced by a plug (not shown).

To prepare for a film deposition run, substrate holder 40 may be cleaned prior to disposing thereon a clean, dry substrate. The flow of inert gas is continued while the plug is removed and end wall 48 and substrate support 40 are disposed in the position indicated in FIG. 1. The flow of inert gas is continued for a few more minutes, and then valve 51 is opened and valve 56 is closed to permit carrier gas to flow through the system.

To form an amorphous film on substrate 38, the vapors from the sources disposed in boats 30, 32, 34 and 36 must be transported to substrate 38. If a high quality film having a controlled thickness and composition is to be deposited, carrier gas containing vapors of the elements to be deposited must be prevented from reaching the substrate until the furnaces reach the desired operating temperatures. The high temperatures and corrosiveness of the system precludes the use of valves between the feeder furnaces and reaction furnace 10. To achieve isolation of the reactants until the system achieves thermal equilibrium, a carrier gas reversal technique is utilized. Thus, after the system is purged with carrier gas by causing it to flow for a few minutes through the feeder furnaces and reaction furnace and exhaust through line 96, valves 68, 70, 72 and 98 are closed, valves 112, 114 and 116 are opened and regulating valve 74 is adjusted to cause the diluent stream of carrier gas to flow therethrough at a reduced rate. The heaters are energized after this backflow of carrier gas is initiated. During the thermal transient time, carrier gas flows from the diluent line into diluent chamber 90 and back through the feeder furnaces from which it is exhausted through oil trap 118. Since the end portions of the feeder furnaces in which glass wool 91 is disposed are not surrounded by resistance heating wire, the temperature of the glass wool is low enough to cause most of the vapors contained in the backflow of carrier gas to condense thereon. When thermal equilibrium is established, the flow is simply reversed by closing valves 112, 114 and 116 and opening valves 68, 70, 72 and 98. The resultant flow of carrier gas transports vapors from boats 32 and 34 to mixing chamber 92. Also, vapors from the chalcogen disposed in boat 36 are transported to the Group IV A element disposed in boat 30 and the reaction products from the resultant reaction are also transported to mixing chamber 92. Regulating valves 76, 78 and 80 are preadjusted so that the desired flow of carrier gas reaches each of the feeder furnaces. The amount of a given element in the film deposited on substrate 38 can be controlled by regulating the temperature of the source and the rate of carrier gas flow over the source. The area of source material exposed to the carrier gas also has an effect on the amount of vapor to be transported to the substrate. However, once a particular type and size of source is selected, the area thereof cannot be conveniently adjusted. It is noted that a very large area source such as a column of grains or beads of the elements to be vaporized could be utilized to fully saturate the carrier gas stream with vapor, thereby increasing the accuracy with which film composition can be controlled.

The passages through which the vapors pass on their way to the substrate must be maintained at minimum temperatures to prevent the premature condensation of vapors thereon. For example, if coupler 26 were too long, the chalcogen vapors from the source disposed in boat 36 could condense on the walls thereof unless it were provided with heating means. In the embodiment illustrated, coupler 26 is not heated since it is relatively short in length and the high temperature at which furnace 12 operates is therefore sufficient to maintain coupler 26 at an adequate temperature. During a deposition run regulating valve 74 is adjusted to increase the flow of carrier gas therethrough so that the diluent stream entering diluent chamber 90 mixes the gases from the feeder furnaces in mixing chamber 92 resulting in the transport of vapors of uniform composition to all parts of substrate 38.

The temperature in reactant furnace 10 must be high enough to prevent the condensation of vapors before they reach substrate 38. However, the temperature of the substrate must be low enough to prevent crystallization of the material being deposited. Therefore, the flow of coolant from source 43 is initiated after the substrate reaches a temperature somewhat above its desired deposition temperature, and it is cooled to the desired temperature prior to the flow reversal which transports reactant gas to the substrate. In the embodiment illustrated, the substrate was permitted to reach a temperature of about 450° C. before the coolant flow was initiated. When the substrate was permitted to initially reach temperatures above 450° C., it appeared that the substrate holder acted as a heat sink and caused some portions of the substrate to remain at temperatures above the desired deposition temperature even though other parts of the substrate were at the desired temperature as indicated by thermocouple 42. This caused the formation of crystallites on those portions of the substrate at which the desired temperature was exceeded. If the temperature of the substrate were too low, particles nucleated from the gas phase before the gas impinged upon the substrate, and a powdery film resulted. When the apparatus illustrated in FIGS. 1 and 2 was used to form the chalcogenide glass films of the specific examples described hereinbelow, the optimum substrate temperature was about 220° C., sooty, black films being formed on substrates having temperatures below 170° C. and dull, light gray films being formed on substrates having temperatures greater than 240° C. It was also found that more uniform films were deposited when the surface of the substrate was disposed in a plane other than perpendicular to the direction of gas flow.

After a time sufficient to form a film having a desired thickness, the direction of gas flow was again reversed and the rate of flow of diluent gas was reduced to cause a backflow of carrier gas from diluent chamber 90 and through the feeder furnaces, the vapor containing carrier gas passing through glass wool 91 and being exhausted through oil trap 118. After the furnace system cooled to room temperature and no vapors were produced by the sources disposed in the feeder furnaces, the system was flushed with carrier gas by opening valves 68, 70 and 72 and 98 and closing valves 112, 114 and 116. End wall 48 and substrate support 40 are then removed and the aforementioned plug is inserted into the end of the furnace. If another deposition run is to follow immediately, the new substrate is disposed on support 40 and the method as previously described is again repeated. If the furnace is to be shutdown, valve 51 is closed and valve 56 is opened and a positive pressure of inert gas is maintained in the furnace.

Various modifications can be made to the described system without departing from the basic invention disclosed herein. As mentioned previously, any number of feeder furnaces can be provided, depending upon the number of elements to be incorporated into the deposited film. Another feeder furnace combination similar to furnaces 12 and 24 could be provided so that both germanium and silicon could be simultaneously deposited. The source material could be in any form suitable for vaporization and passage of carrier gas thereover. Two or more substrates could be simultaneously subjected to the flow of reactant gas and the substrate support 40 could be made in any suitable shape and cooled by any suitable means. Mixing chamber 92 need not be located in reactant furnace 10; it could be a separate device connected by heated coupling means to the reactant furnace.

Example 1

A film containing silicon, arsenic and tellurium was prepared as follows. A furnace similar to that illustrated in FIGS. 1 and 2 was constructed of high silica content glass. During the time that the furnace was not being used, valve 51 was closed and valve 56 remained open to permit argon from source 52 to flow through lines 58, 60, 62 and 64, valves 66, 68, 70 and 72 also being open. This argon gas flowed through all of the feeder furnaces and through main furnace 10 and was exhausted through line 96, valve 98 also being open. Although end wall 48 and substrate holder 40 were removed, end wall 48 was replaced by a plug (not shown) so that a positive argon gas pressure was maintained within the furnaces.

Substrate holder 40, which was constructed of stainless steel, was cleaned by blasting with glass beads to remove any film previously deposited thereon. A glass substrate was cleaned in detergent, rinsed and baked at 400° C. for 1 hour before being mounted on the substrate holder. While maintaining the flow of argon through the feeder furnace and into main furnace 10, the plug was removed and substrate holder 40 and end wall 48 were inserted into their illustrated position. After end wall 48 was replaced, the flow of argon was continued for 5 minutes. At that time valve 51 was opened, valve 56 was closed and carrier gas suupplied by source 50 was permitted to flow through and purge the entire furnace system for 5 minutes, valve 98 remaining open to exhaust the carrier gas which consisted of 85% helium and 15% hydrogen. At this time valves 68, 70, 72 and 98 were closed and valves 112, 114 and 116 were opened to cause the forming gas to flow through the diluent line 58 into diluent portion 90 of furnace 10 and back through feeder furnaces 12, 14 and 16. For this backflushing operation, valve 74 was adjusted so that the carrier gas flowed at a reduced rate of 20 cc./min. from the feeder furnaces through valves 112, 114 and 116, and it was exhausted through oil trap 118. During the back-flush operation, heating coils 28, which were made from a commercially available heating element wire, were energized and within one hour and twenty minutes all of the furnaces reached the operating temperatures indicated by Table 2.

TABLE 2

| Feeder furnace | Element disposed in furnace | Operating temperature (° C.) | Gas flow rate (cc./min.) |
| --- | --- | --- | --- |
| 12 | Si | 1,075 | 180 |
| 14 | As | 455 | 22 |
| 16 | Te | 555 | 22 |
| 24 | Te | 445 | 180 |

At that time the temperature of the substrate, as indicated by thermocouple 42, was about 450° C. and the temperature in diluent chamber 90 was 975° C. Air from source 43 was then admitted to the chamber within substrate holder 40 and the temperature of the substrate dropped to about 220° C., at which time the flow of coolant was regulated to maintain the substrate at that temperature. Gas flow through the feeder furnaces was then reversed by opening valves 68, 70 and 72 and closing valves 112, 114 and 116, and valve 74 was adjusted to increase the flow of the diluent gas stream to 530 cc./min. Valves 76, 78 and 80 had previously been adjusted so that the gas flow therethrough would supply furnaces 12, 14, 16 and 24 with the gas flow rates indicated by Table 2. During the forward flow of carrier gas through valves 68, 70 and 72, arsenic and tellurium vapors were carried from furnaces 14 and 16, respectively, into mixing chamber 92. Tellurium vapors from furnace 24 were carried into furnace 12 where a reaction with the silicon disposed in boat 30 formed tellurides which were also carried to mixing chamber 92. The flow of diluent gas from chamber 90 also entered chamber 92 where all of the gases were mixed. The resultant mixture flowed over substrate 38 where a semiconducting chalcogenide glass film was formed at the rate of about 2000 A. per minute. The exhaust gases from this portion of the operation flowed through line 96 and valve 98 and were exhausted through oil trap 100. After 2 minutes of film deposition time, valves 68, 70, 72 and 98 were closed, valves 112, 114 and 116 were opened, and valve 74 was adjusted to decrease the flow rate of diluent gas into chamber 90 to about 20 cc./min. In this backflow period, during which gas flowed from chamber 90 and into feeder furnaces 12, 14 and 16, resistance heating coils 28 were de-energized and the entire system was cooled to room temperature. Substrate holder 40 and end wall 48 were removed and a plug was inserted into the furnace.

Example 2

An arsenic rich film was made by a process similar to that of Example 1, but valve 70 was closed to prevent the flow of carrier gas through furnace 16, and heater 15 was not energized. Carrier gas flowed through furnaces 12 and 24 at the rate of 180 cc./min., and the rate of carrier gas flow to furnace 14 and to diluent chamber 90 was 22 cc./min. Furnaces 12, 14 and 24 were heated to 1102° C., 467° C. and 396° C., respectively. The temperature of diluent chamber 90 was 924° C. By following a procedure similar to that of Example 1, an arsenic-rich film was deposited upon a sapphire substrate. Immediately after removal of the substrate from the furnace, X-ray analysis indicated that the film was amorphous. However, after 24 hours the originally shiny surface of the film began to appear hazy. An additional X-ray analysis performed at that time indicated the presence of crystallinity which was probably due to oxidation of the arsenic on the surface of the film.

Example 3

In an attempt to reduce the amount of crystallinity due to oxidation of the surface of a deposited film, another deposition run was performed using the flow rates and temperatures set forth in Example 2. However, after the run had progressed for 1½ minutes, valve 72 was closed to stop the flow of carrier gas to furnace 14. Thus, only silicon and tellurium were deposited on the substrate for the remainder of the deposition run which lasted an additional ½ minute. After 24 hours the film produced by Example 3 was subjected to X-ray analysis. Very slight crystallinity was indicated at that time, but the amount of crystallinity was far less than that indicated by analysis of the film of Example 2.

The method set forth in Example 3 results in an abrupt change in composition. A gradual change could be effected by adjusting valve 80 to slowly reduce the flow of carrier gas to furnace 14 in which the arsenic is disposed. In view of the ease with which this adjustment in flow rate is made, it is obvious that the rate of carrier gas flow to any furnace can be increased or decreased to vary the amount of vapors transported thereby. Composition changes could also be effected by adjusting the temperature of the feeder furnaces in which the sources are disposed.

I claim:

1. A method of forming a chalcogenide glass film which comprises at least one of the chalcogens sulfur, selenium and tellurium and at least one of the Group IV A elements germanium and silicon, said method comprising:

disposing a substrate in a deposition chamber, heating said substrate to a deposition temperature less than the crystallization temperature of said chalcogenide glass to be deposited, said temperature being sufficiently high to cause the formation of a continuous homogeneous amorphous film on said substrate and to prevent the nucleation of individual particles, providing a first gas mixture of carrier gas containing vapors of a chalcogen selected from the group consisting of tellurium, selenium and sulfur, the partial pressure of said chalcogen in said first gas mixture being between $10^{-2}$ and 100 mm. Hg, heating a Group IV A element selected from the group consisting of germanium and silicon to a temperature sufficient to support a reaction between said chalcogen vapors and said Group IV A element, passing said first gas mixture over the surface of said Group IV A element to form at the surface of said Group IV A element products of reaction of said chalcogen and said Group IV A element, said products of reaction vaporizing and combining with said carrier gas and said chalcogen vapors to form a second gas mixture, and flowing said second gas mixture onto a surface of said substrate where there is formed a film of a chalcogenide glass comprising said chalcogen and said Group IV A element.

2. The method of claim 1 wherein the step of heating said substrate comprises raising the temperature of said substrate to a value between 160° C. to 250° C.

3. The method of claim 1 wherein the step of heating said substrate comprises heating said deposition chamber to a temperature that tends to heat said substrate to a temperature greater than 250° C. and cooling said substrate to maintain the temperature thereof less than 250° C.

4. The method of claim 1 wherein the step of heating said substrate comprises heating said deposition chamber to a temperature that tends to heat said substrate to a temperature greater than said deposition temperature and disposing said substrate on a cooled support.

5. The method of claim 4 wherein the step of providing a first gas mixture comprises heating a source of said chalcogen to a temperature sufficient to provide said partial pressure and causing said carrier gas to flow over the surface of said chalcogen source.

6. The method of claim 5 wherein said carrier gas is a reducing gas having good thermal conductivity.

7. The method of claim 6 wherein said carrier gas is selected from the group consisting of hydrogen, forming gas and mixtures of hydrogen and helium.

8. The method of claim 6 further comprising the step of mixing with said second gas mixture a diluent stream of said carrier gas prior to directing said second gas mixture onto the surface of said substrate.

9. The method of claim 6 further comprising the step of mixing with said second gas mixture vapors of one or more elements selected from the group consisting of tellurium, selenium, sulfur, arsenic, phosphorus, chlorine, bromine, iodine, antimony, gallium, indium and thallium prior to the step of directing said second gas mixture onto the surface of said substrate.

10. The method of claim 6 further comprising the step of mixing with said second gas mixture a diluent stream of said carrier gas and vapors of one or more elements selected from the group consisting of tellurium, selenium, sulfur, arsenic, phosphorus, chlorine, bromine, iodine, antimony, gallium, indium and thallium prior to the step of directing said second gas mixture onto a surface of said substrate.

11. The method of claim 10 wherein the step of mixing said second gas mixture with said diluent stream and said vapors of one or more elements is performed in a mixing chamber having a temperature sufficiently high to prevent substantial condensation of mixed vapors prior to the time that said vapors are directed onto said substrate.

12. The method of claim 1 wherein the step of providing a first gas mixture comprises heating a source of said chalcogen to a temperature sufficient to provide said partial pressure and causing said carrier gas to flow over the surface of said chalcogen source.

13. The method of claim 12 further comprising the step of mixing with said second gas mixture vapors of one or more elements selected from the group consisting of tellurium, selenium, sulfur, arsenic, phosphorus, chlorine, bromine, iodine, antimony, gallium, indium and thallium prior to the step of directing said second gas mixture onto the surface of said substrate.

14. A method of forming a chalcogenide glass film comprising at least one of the chalcogens sulfur, selenium, and tellurium and at least one of the Group IV A elements germanium and silicon, said method comprising disposing a substrate in a deposition chamber, heating said substrate to a temperature less than the crystallization temperature of said chalcogenide glass to be deposited, said temperature being sufficiently high to cause the formation of a continuous homogeneous amorphous film on said substrate and to prevent the nucleation of individual particles, providing a heated mixing chamber, heating first and second chalcogen sources of the group consisting of tellurium, selenium and sulfur to temperatures sufficient to increase the partial pressure of each to a value between $10^{-2}$ and 100 mm. Hg, heating a Group IV A element selected from the group consisting of germanium and silicon to a temperature sufficient to support a reaction between vapors from said first chalcogen source and said Group IV A element, passing a first stream of carrier gas over the surface of said first chalcogen source to provide a first gas mixture, passing said first gas mixture over the surface of said Group IV A element to form at the surface of said Group IV A element products of reaction of said chalcogen and said Group IV A element, said products of reaction vaporizing and combining with said first stream of carrier gas and said chalcogen vapors to form a second gas mixture, passing a second stream of carrier gas over said second chalcogen source to provide a third gas mixture containing said carrier gas and vapors from said second chalcogen source, flowing said second and third gas mixtures into said mixing chamber, and flowing the gas mixtures from said mixing chamber onto a surface of said substrate where there is formed a chalcogenide glass film.

15. The method of claim 14 wherein the same chalcogen is present in said first and second sources of chalcogen.

16. The method of claim 14 wherein different elements are in said first and second sources of chalcogen.

References Cited

UNITED STATES PATENTS

| | | | |
|---|---|---|---|
| 3,354,004 | 11/1967 | Reisman et al. | 117—106 A |
| 3,441,000 | 4/1969 | Burd et al. | 117—106 A |

CHARLES E. VAN HORN, Primary Examiner

J. W. MASSIE, Assistant Examiner

U.S. Cl. X.R.

29—569; 117—106 A, 169 R; 148—174